United States Patent [19]

Eastwood et al.

[11] 3,801,824

[45] Apr. 2, 1974

[54] COMPUTER MEMORY DEVICE

[75] Inventors: H. Keith Eastwood, Beaconsfield, Quebec, Canada; Robert Johannes, Williamsville; Clifford H. Griffiths, Rochester, both of N.Y.; Anibal Gavini, Buenos Aires, Argentina

[73] Assignee: Multi-State Devices Ltd., Doval, Quebec, Canada

[22] Filed: May 8, 1973

[21] Appl. No.: 358,283

[30] Foreign Application Priority Data

May 16, 1972 Canada ................................ 142330

[52] U.S. Cl......... 250/211, 340/173 LM, 350/160 R

[51] Int. Cl....... G02f 1/28, G02f 1/36, G11c 11/44

[58] Field of Search. 340/173 LT, 173 LS, 173 LM; 250/211 R; 350/160 R

[56] References Cited

UNITED STATES PATENTS

| | | | |
|---|---|---|---|
| 3,509,348 | 4/1970 | Boyle et al. | 250/211 R |
| 3,550,096 | 12/1970 | Alphonse et al. | 340/173 LM |
| 3,623,795 | 11/1971 | Taylor | 350/160 R |
| 3,737,877 | 6/1973 | Feinleib | 340/173 LM |

*Primary Examiner*—James W. Lawrence
*Assistant Examiner*—T. N. Grigsby
*Attorney, Agent, or Firm*—Fleit, Gipple & Jacobson

[57] ABSTRACT

A computer memory device utilizes the effect of a wide hysteresis loop which certain memory materials can exhibit at a predetermined critical temperature. A high optical transmission or reflection value and a low optical transmission or reflection value, respectively, will thereby be achieved, depending on whether the memory material is heated or cooled to reach this critical temperature. Laser beams of preselected wavelengths and power levels are directed onto this memory material through an optical arrangement to effect the writing or reading functions.

22 Claims, 6 Drawing Figures

COMPUTER MEMORY DEVICE

This invention relates to a novel computer memory device. More particularly, it relates to an improved optical memory device suitable for computer systems.

Optical computer memory devices are already known. One such device has, for example, been described in U.S. Pat. No. 3,509,348 issued Apr. 28, 1970 to W.S. Boyle et al. According to this patent, a thin layer of variable absorptivity material is deposited on pedestal-like members forming a heat sink, and optical means are provided for irradiating these members with optical energy causing the film to undergo a metal-semiconductor phase transition. This is done by means of two light beams one of which is typically infrared and is used to bias the module in its low temperature state, whereas the other beam is visible and is used to switch the module to its high temperature state (i.e. the writing function). This approach, however, has several important limitations. The need of having the film of memory material on separate pedestals restricts the packing density that can be achieved and makes the scanning system critically dependent on the precise positions of the film. In addition, the formation of pedestal-like members is a difficult and costly operation.

Generally, an optical memory device that would combine the necessary heat sinking and optical properties together with high packing density and other desirable features, such as simplicity of manufacture and general efficiency, has, to our knowledge, not yet been designed.

It is therefore the principal object of the present invention to provide an improved optical memory device which will remove or substantially obviate the disadvantages and limitations of the presently known optical memory devices and which will result in a simple and efficient design suitable for most computer systems.

Another object of the present invention is to produce an optical memory device based on the effect of a wide hysteresis loop which certain memory materials can exhibit about a predetermined critical temperature and whereby a high optical transmission or reflection value and a low optical transmission or reflection value, respectively, will be achieved, depending on whether the memory material is heated or cooled to reach such critical temperature.

Still another object of the present invention is to porvide suitable irradiation means, an optical arrangement and sensor means for effecting the writing or reading functions on the memory material.

A still further object of the present invention is to provide means for erasing the written material when desired.

Other objects and advantages of the present invention will become apparent from the following more detailed description thereof.

Generally, the optical computer memory device in accordance with the present invention comprises:

a substrate with a smooth surface;

a film of a material coated on at least a portion of said smooth surface, said film of material exhibiting a wide hysteresis loop such that at a same critical temperature a high optical transmission or reflection value and a low optical transmission or reflection value, respectively, will be achieved, depending on whether the film of said material is heated or cooled to achieve said critical temperature;

means for maintaining said substrate with the film of said material coated thereon at substantially said critical temperature;

optical means and a source of irradiations interacting therewith for impinging upon said film irradiations of preselected wavelengths and power levels;

and radiation sensitive means adapted to produce suitable output signals when said irradiations are directed thereonto from said film.

The source of irradiations is particularly adapted to produce irradiations that will heat said film coated on said substrate at predetermined discrete areas upon which said irradiations impinge, thereby writing dots or "bits" of information on said film, which become stored at the critical temperature. In addition, this source of irradiation is also adapted to produce irradiations that will be blocked by the film when the critical temperature has been reached by cooling, but will pass therethrough when said critical temperature has been reached by heating. The irradiations passing through said film will be transmitted onto the irradiation sensitive means and thereby produce suitable output signals resulting in reading of the information written on the film.

On the other hand, the source of irradiations may also be adapted to produce irradiations that will be blocked by the film when the critical temperature has been reached by heating, but will be reflected therefrom when said critical temperature has been reached by cooling. The irradiations reflected from the film will then be directed to the radiation sensitive means and thereby produce suitable output signals resulting in reading of information written on said film.

A preferred source of irradiations is adapted to produce, at a predetermined sequence, irradiations of preselected wavelength and power for writing, and irradiations of another wavelength and power for reading, although irradiations of a preselected wavelength and high power can be used for writing and irradiations of the same wavelength and low power, for reading. In addition, such source of irradiations may consist of two separate irradiation supplies, one for writing and one for reading. Such source or supplies of irradiations are preferably lasers capable of emitting light beams of desired wavelengths and power levels.

The optical means used in the computer memory device of the present invention generally comprise a combination of mirrors and lenses for transmitting irradiations from the source thereof and focussing them onto the film of said memory material coated on the substrate. Also, between the source of irradiations and the optical means there are provided means for interrupting the intensity of the irradiations at predetermined intervals, when this intensity is used for the writing function. This, of course, is necessary in order to write dots or "bits" on the memory material which will then be stored for computer purposes; such interrupting means providing the "on" and "off" irradiation states usually consist of a modulator.

The optical means are also combined with means for effecting sequential or random scanning of the memory film by the irradiations impinging thereupon.

Moreover, in accordance with a preferred embodiment of the present invention, means are provided for producing synchronized and controlled relative movement between the substrate with the film of memory material coated thereon and the source of irradiations.

This can easily be achieved by coating the memory material on a disc or a drum and then rotating the disc or drum at controlled speed and in a synchronized manner.

In addition, cooling means may be provided in order to cool the film of memory material in predetermined areas, thereby erasing the matter that has been written thereon.

The substrate on which the memory material is coated will usually consist of a material capable of withstanding a temperature of about 400° C and capable of providing the film coated thereon with a wide hysteresis loop such that at a predetermined critical temperature a high optical transmission or reflection value and a low optical transmission or reflection value, respectively, will be achieved, depending on whether this critical temperature value is reached by heating or cooling. In the case of transmission, of course, the substrate material must be transparent and silica glass or soda glass are quite suitable for such purposes.

The film of the memory material may be a film of $VO_2$ and, in such case, the critical temperature will be approximately 65° C. Other materials which undergo phase changes at certain critical temperatures and pass from an optically transparent to an optically opaque form are also suitable, examples of such materials are $V_2O_3$, $Ag_2S$, $Cu_2HgI_4$. The transition critical temperatures of these materials are approximately — 120° C, 180° C and 60° C respectively.

The thickness of the film employed may depend on several factors and particularly on the sensing system. As thickness increases, the ratio of absorption in "on" and "off" states increases, but the absolute transmission decreases. Thus, a balance should be achieved to obtain a good ratio of absorption and at the same time an adequate amount of light transmitted through the material so that the sensors may produce adequate impulses. In the case of reflection, however, this is less important but, again, the reflectivity must be such as to produce proper reading by the sensors. As an example, for $VO_2$, thicknesses between 1,000 Angstrom units and 4,000 Angstrom units are considered effective and the preferred thickness is of about 3,000 Angstrom units.

One of the important conditions of the present invention is to maintain the substrate and the film coated thereon at substantially the critical temperature. This can be readily accomplished by providing a suitable enclosure for the substrate and the memory material with means for bringing the temperature within the enclosure to the critical temperature value as well as temperature control means for maintaining said temperature within the enclosure at said critical value.

The invention will now further be described, by way of a non limitative example, with reference to the accompanying drawings, in which.

Figure 1:
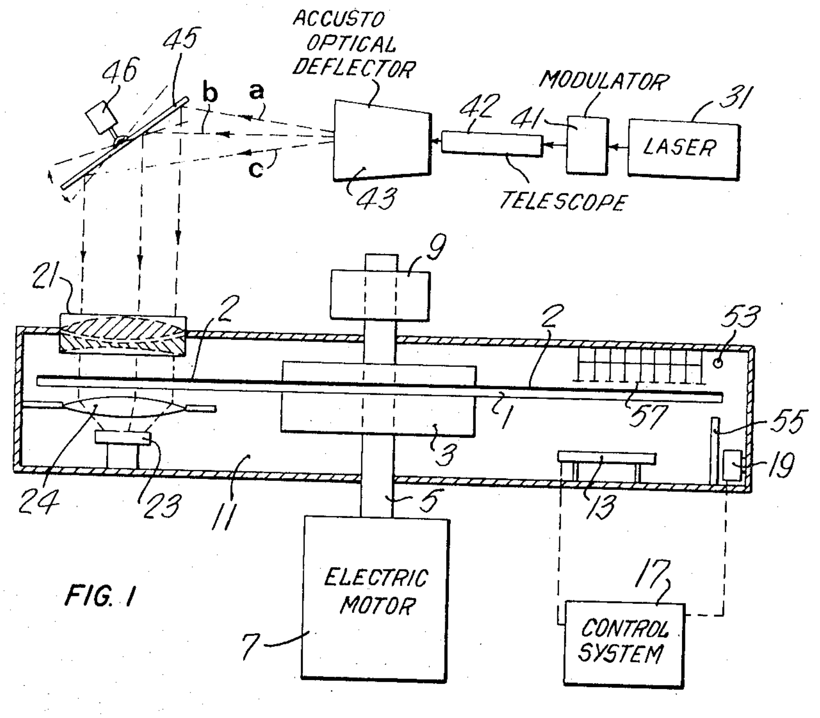
FIG. 1 is a partly sectional and diagrammatic plan view of a computer memory device according to one embodiment of the present invention.
Figure 2:
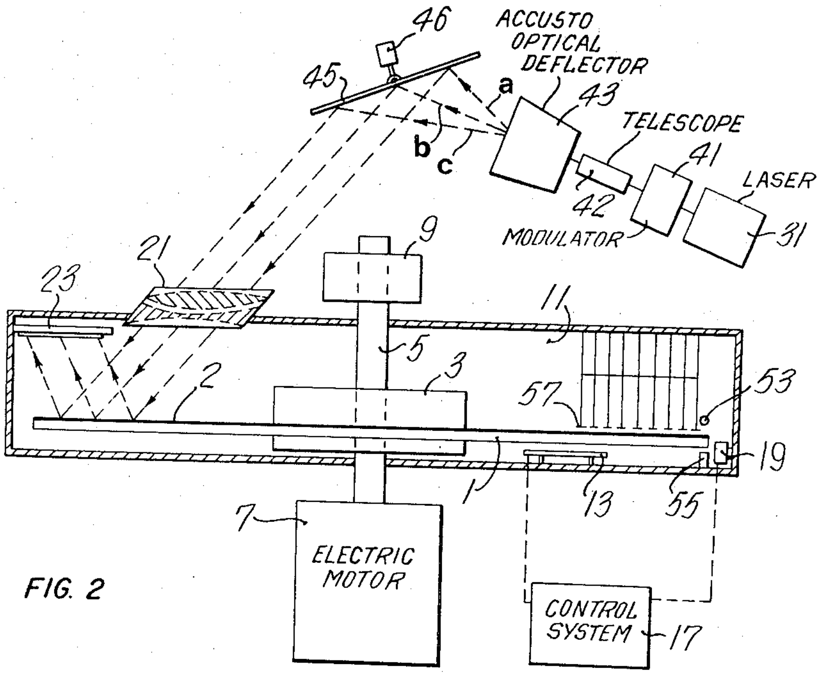
FIG. 2 is a partly sectional and diagrammatic plan view of another embodiment of the computer memory device according to the present invention.
Figure 3:
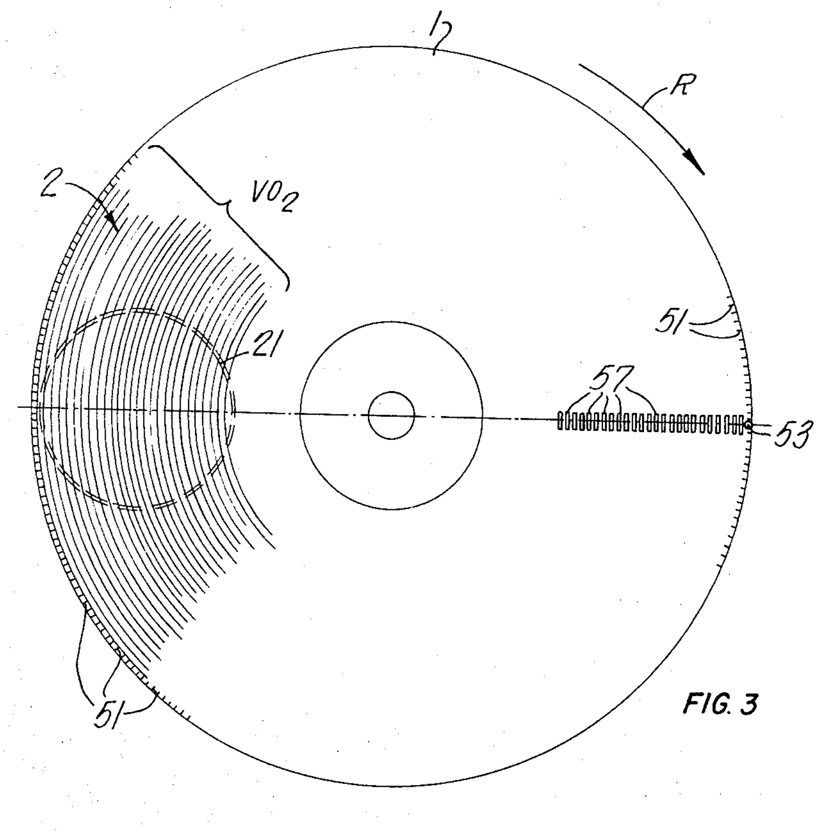
FIG. 3 is a front view of a disc shown in FIGS. 1 and 2 and additionally including thermoelectric cooling elements.

Referring to FIGS. 1, 2 and 3, a disc 1 having a diameter of 6 inches is fixedly mounted through a keyed hub 3 onto an output shaft 5 of a constant speed electric motor 7 which runs at 100 revolutions per second, the free end of the shaft 5 being supported by a suitable bearing 9 so that disc 1 rotates without vibrations. It should be noted that specific details with respect to the size of the disc, the speed of the motor and the particular arrangement of the parts are only given by way of example and without intention of limiting this invention in any way. Thus, larger discs of, e.g. 12 or even 20 inches could be used and, obviously, the speed of the electric motor would then be modified.

Figure 4:
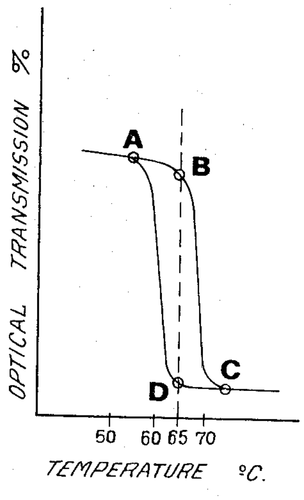
FIG. 4 shows a hysteresis loop illustrating the variation of optical transmission of a thin film of $VO_2$ as its temperature is varied through a critical temperature.
Figure 5:
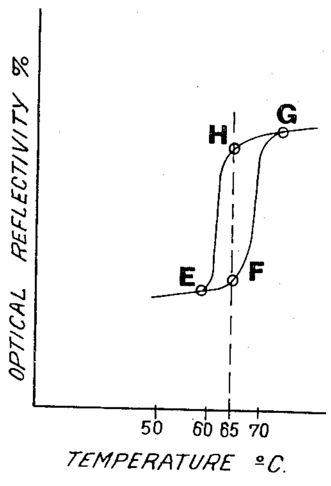
FIG. 5 shows a hysteresis loop illustrating the variation of optical reflectivity of a thin film of $VO_2$ as its temperature is varied through a critical temperature.

Disc 1 is mounted inside a chamber 11 which contains a heating element 13 coupled to a control system 17 and a temperature sensing element 19, which together act to keep the interior of chamber 11 at a predetermined critical temperature which in this particular case is 65° C ± 0.5° C. It should be noted that this critical temperature depends on the memory material employed which, in the present example, is $VO_2$, and also on the calibration used. Consequently, it would not be surprising that with the same material one could arrive at a slightly different temperature simply because of a difference in calibration. Also, the critical temperature and the exact form of the hysteresis curves, as illustrated in FIGS. 4 and 5, depend upon the physical form of the $VO_2$ in the film, the impurities or dopants that may be present in the $VO_2$ and upon the manner in which the film is deposited on the disc substrate. Generally, memory films with optimum characteristics and wide hysteresis loops are prepared by radio frequency sputtering on suitable substrates. In the present specific example, a fused silica disc substrate was placed on a heated plate within the system where the pressure was regulated to 0.6 milliTorr of oxygen and 6.9 milliTorr of argon. The substrate temperature was raised to 350° C and sputtering was commenced with an R.F. power of 380 watts from a 99.9% vanadium target. After a presputtering period of 15 minutes to allow equilibrium to be attained and after removal of a shutter, the $VO_2$ was allowed to deposit on the substrate. This procedure results in a deposition rate of approximately 30 A/minute of $VO_2$. Several similar techniques of depositing vanadium dioxide on substrates are known in the art (e.g. "Reactively Sputtered Vanadium Dioxide Thin Films" by E.N. Fuls, D.H. Hensler and A.R. Ross, Applied Physics Letters, Volume 10 No. 7, pages 199–201, Apr. 1, 1967; Preparation and Properties of Vanadium Dioxide Films by J.B. MacChesney, J.F. Potter and H.J. Guggenheim, J. Electrochem. Soc.: Solid State Science, pages 52 to 55, January, 1968).

The upper surface of the disc 1 is coated over an outer annular region with a thin film of $VO_2$ (vanadium dioxide). In the present specific example, disc 1 is formed of fused silica and the $VO_2$ film has a thickness of 3,000 Angstrom units. Such film is deposited by radio frequency sputtering as already described above and in such a way as to produce a wide hysteresis loop.

In FIG. 4, a typical hysteresis loop for $VO_2$ is shown wherein optical transmission is plotted against temperature variations. Thus, the optical transmission percent decreases slightly as the temperature of the film is brought towards the critical temperature of 65° C. As the temperature rises towards this critical temperature, the optical transmission passes through point A on the characteristic curve towards point B which is at about 65° C. Then, if the temperature is further raised, the optical transmission will fall rapidly to point C. From this point, if the film is cooled back to 65° C, the optical transmission will stabilize at point D and if further cooling is effected, it will rise to point A following a different curve than the one it took to fall to point C. Thus, depending on whether the critical temperature of 65° C is approached by heating (from point A), or by cooling (from point C) a very different optical transmission will result. At point B, the film will be relatively optically transparent and will permit light to pass therethrough and at point D, it will be relatively optically opaque and will block most of the light impinging thereon.

When the film is biased at 65° C and an intense beam of light is focussed thereon, a discrete area of the film will be heated from point B to or beyond point C, forming an opaque dot which will be stored at point D when the temperature cools to the bias temperature of 65° C. If it is desired to erase this dot, one only needs to cool the film back to point A and the film will again become optically transparent.

A similar situation will prevail in the case of a hysteresis loop which is illustrated in FIG. 5 and which shows a plot of optical reflectivity percent versus the temperature variations for wavelengths greater than about 980 nanometers. Here, heating of the film will result in the passage of optical reflectivity from point E to point F at the critical temperature of about 65° C. In both cases, the reflectivity will be low and the film will absorb the radiations. Further heating will result in a very rapid increase in reflectivity up to point G. Then cooling back to the critical temperature of 65° C will maintain the film in a high reflectivity value at point H. Still further cooling will then drop the reflectivity sharply back to point E. Thus, when the film which is at 65° C is heated by impinging a light beam at predetermined intervals, its reflectivity increases sharply from point F to point G thereby writing dots on the film, and when the temperature of the film goes back to 65° C, the written dots are stored at point H which is a point of high reflectivity and from which a light beam is easily reflected for reading purposes. Then, if further cooling is effected, the optical reflectivity drops sharply to point E thereby erasing the matter stored at point H and rendering the film much less reflective and more absorptive.

Figure 6:
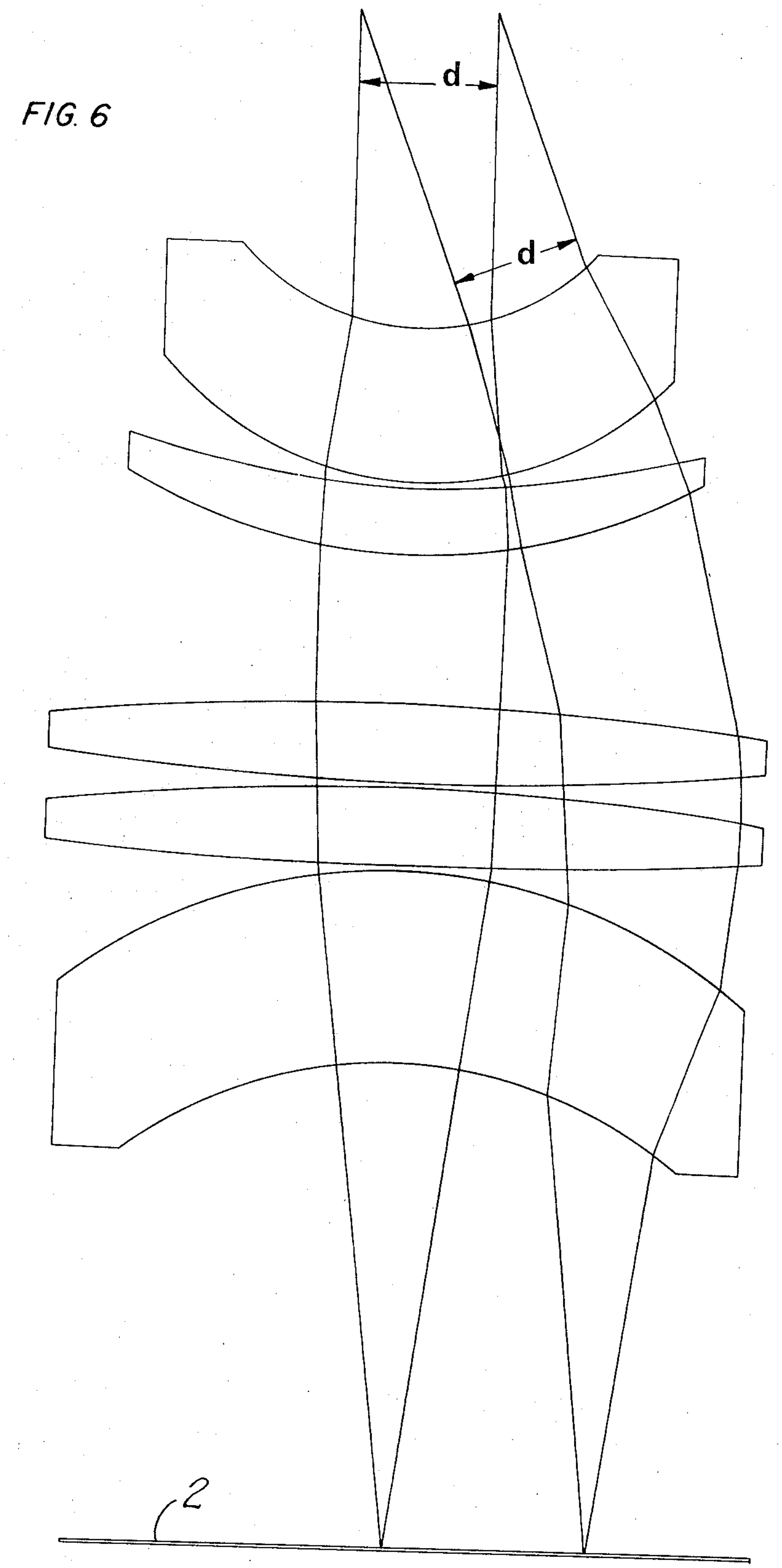
FIG. 6 illustrates one arrangement of a compound lens that can be used to focus light beams on the memory material in accordance with the present invention.

In the upper wall of chamber 11 there is mounted a suitable compound lens 21 in such a way that the light beams passing through this lens will be focussed on the film 2 coated on disc 1. The lenses shown in FIGS. 1 and 2 are diagrammatic in nature, however, one design of a suitable compound lens is illustrated in FIG. 6 in a greatly enlarged cross-sectional view. Instead of using such compound lenses, it is also possible to mount a plurality of small simple lenses extending in edge to edge relationship over the appropriate region of disc 1 which is coated with the film of $VO_2$.

Preferably, all parts inside chamber 11 which are not involved in the actual transmission of light, are provided with a matt black finish so as to avoid light reflection and to cause absorption of all incident light.

A photosensitive element 23 is also provided within chamber 11 and adapted to receive light beams either transmitted through film 2 and disc 1 (FIG. 1) or reflected from film 2 (FIG. 2) and to produce suitable output signals when these beams impinge onto this photosensitive element 23. As shown in FIG. 1, there may be provided between the disc 1 and the photosensitive element 23 another suitable lens 24 which will focus the beams from a wide angle towards the photosensitive element 23. This construction makes it possible to use much smaller photosensitive elements than the width of the $VO_2$ film on disc 1.

The objective of the construction described so far is to provide for the transmission of light through selected areas of $VO_2$ film or reflection of light from such selected areas of $VO_2$ film to a variable extent, depending upon the thermal history of said areas, and for the reception of light transmitted through or reflected from said areas by an appropriate photosensitive element.

Exposed outside of chamber 11 is a laser 31 producing light beams of desired wavelengths and power levels. Generally, lasers producing wavelengths between about 0.2 microns and 10 microns and power levels in the range of between about 50 and 500 milliwatts are suitable. In this example a laser operating at a wavelength of $1.06\mu$ and at the power of 250 milliwatts is employed. Coaxially with this laser, there is provided an optical modulator 41 so that the laser beams generated by laser 31 are passed therethrough. This modulator 41 provides an "on" and "off" effect, allowing transmission of about 80% power, emitted by the laser 31, or about 1% respectively. Thus, for writing purposes the modulator will be turned "on" and "off" at a predetermined sequence so that it will allow high transmission and low transmission of the laser beam successively. This beam will further be transmitted and focussed by the optical means onto the memory film on which opaque dots or "bits" of information will thus be written.

In the case of reading, the modulator may remain completely in the "off" condition, thereby attenuating the power of the laser to about 1% or about 1 milliwatt.

Following modulator 41 and arranged coaxially therewith, there is provided a telescope 42. The reason for this telescope is that the beam generated by the laser usually has a small diameter of about 1 to 3 millimeters. The telescope increases this diameter of the beam to about 30 millimeters making it much more suitable for further optical transmission and reflection. Thus, referring to FIG. 6, the beam diameter "d," in the present example would be about 30 millimeters. This, however, is not limitative and the man of the art can easily adjust such diameter and other properties of the beam, laser and modulator to provide most suitable results in each particular case, depending on the lenses, reflectors, mirrors and other optical arrangements employed.

Following telescope 42 and in axial arrangement therewith, there is provided an acousto-optical deflector 43. In this example, an acousto-optical deflector producing about 200 deflections of the beam received from the laser had been employed. Such deflectors are known in the art and there is no need to describe them in greater detail.

A beam such as beam "a," "b" or "c," deflected in an appropriate direction by acousto-optical deflector 43 is directed towards a suitable mirror 45 which, itself, can be adjusted in many alternative positions by an actuator 46 (see particularly FIG. 1 wherein small arrows illustrate the movement of such mirror). In the present example, a galvanometer mirror which can be moved through 25 different positions had been used.

Mirror 45 then reflects the beam received from the acousto-optical deflector towards the compound lens 21 which focusses said beam on the memory film 2. It will, therefore, be realized that in each position of mirror 45 some 200 tracks corresponding to the 200 beams that can be deflected by the acousto-optical deflector 43, can be written and stored on the memory film. Since there are 25 positions of mirror 45 in this particular example, then it is possible to write about 25 bands of information each containing 200 tracks. Assuming a 25 centimeter average track length and 10 microns spacing for the written dots, there will thus be written about 25 thousands bits of information per track and $5 \times 10^6$ bits of information per band. This means that a disc of six inch diameter and the approximate size of which is shown in FIG. 3, will store $1.25 \times 10^8$ bits of information. It should also be realized that only a portion of this disc is coated with the memory film and that the amount of information stored thereon approximately corresponds to that which is now stored in a stack of 10 double surface 14 inch magnetic memory discs.

For reading purposes, the tracks of stored information of the memory of the present invention are scanned randomly. Address information provided by the computer directs the deflector system to the proper track. The selection of the proper track is then done through a closed loop servo system with position information being provided by reference tracks previously written upon the disc. Generally, each band of 200 tracks will have two or three first tracks for reference purposes. These notions are, however, well known to the man of the art and need not be described in detail.

It is also necessary to synchronize the operation of external circuits associated with the photosensitive elements and the modulator with the rotation of disc 1 and for this purpose disc 1 may be provided at its edge with a plurality of radial lines at predetermined intervals. These lines can be formed by removing or scratching off very thin and short radial strips 51 from the edge of the disc thus enabling light to pass therethrough from a point light source 53 and towards a photoelectric cell 55. The output from cell 55 thus provides a pulse for each line 51 resulting in an output necessary for synchronization and speed control.

In addition, in a preferred embodiment of the present invention, thermoelectric coolers 57 are provided just above the rotating disc 1. In this particular example, some 25 of such coolers are provided, one just above each of the 25 bands written on the disc. Thermoelectric cooling elements are known in the art and, as illustrated, particularly in FIG. 3, they are so disposed just above each band of the disc that they can act independently upon each such band, when they are energized, to cool only one selected band at a time. Since the disc is made of glass having a low thermal conductivity, the cooling effect of each of the elements can be restricted to the band concerned as the disc rotates. Arrow R indicates the direction of rotation of disc 1. Such restricted cooling makes it possible to erase only the desired band or bands of written information without affecting the remaining bands.

Considering now the operation of the apparatus described above and illustrated in FIG. 1, normally motor 7 is energized to bring disc 1 up to its predetermined working speed of 100 revolutions per second, and the control system 17 is made to function to bring the contents of chamber 11 to a predetermined critical temperature. In this example, this critical temperature is 65° C ± 0.5° C. As already mentioned previously, this temperature may vary somewhat depending on calibration, method of disposition of the film, impurity levels, and the like, and the 65° C figure should not be taken as completely accurate for every device manufactured with $VO_2$ film, although it was found reasonably accurate for the specific device produced by the applicants. During start up of the equipment, all the $VO_2$ film will follow the part of the characteristic hysteresis curve shown in FIG. 4, from A to B, and will be in the state of point B on that curve where all areas of the film have a relatively high optical transmission to light, namely they are optically transparent. This point will be referred to as state "zero" and it will cause a high output from the photosensing element 23. The opposite state at point D with a low light transmission will be referred to as state "one." This "one" state is achieved through cooling from C to D and it is in this state that the written information produced by heating from B to C, is stored. In this state "one" the areas of the film that have been first heated and then cooled back to this state, have a low optical transmission and have become optically opaque. They will produce a low or "negative" output from the photosensing element 23.

Once chamber 11 and its contents have reached a stable operating temperature (in this case 65° C ± 0.5° C) laser 31 can be used to effect writing and reading of binary information on small areas of $VO_2$ film which areas then act as binary memory cells. Thus, normally, modulator 41 is energized so that substantially no light energy (about 1% or less) passes through the optical system to the $VO_2$ film (in the "off" condition). To effect writing of binary symbols, the modulator is switched to "on" condition to permit maximum transmission (about 80% of light duration). Thus, when the light is permitted to pass through the modulator, it will be directed through the acousto-optical deflector 43 and the mirror 45 will reflect it towards and through the lens 21 which will focus it upon discrete areas of $VO_2$ film 2. Each area onto which such film is focussed is a dot with a diameter of about 5 microns. The modulator is operated so that the time duration of the dot corresponds to a dot travel on the disc of 1 micron, i.e. since the linear speed of the disc is about 40 million microns per second, th dot duration will by 1/40 million part of a second or 25 nanoseconds. Thus, the area of the film affected by heating due to irradiation has a width of about 5 microns and a length of about 6 microns. As mentioned earlier, discrete dots can thus be written at a circumferential pitch of about 10 microns.

During a recording or writing period, a very large number of small areas of the film are thus written by impingement of light thereof in a predetermined sequence, which light produces heating of the film from point B to point C (see FIG. 4) and forms dots. These small areas or dots become opaque due to heating and are stored when the film is cooled back to the critical temperature of 65 °C at which these areas will be in the "one" state at point D.

To read out from the disc the information which has been stored as described above, modulator 41 is switched "off" to permit only about 1% transmission of light therethrough forming a continuous beam which can randomly scan the various tracks recorded previously. When this light from laser 41 strikes an area in the "one" state (low light conductivity state), then the light falling on the written spot will be blocked and will not pass to the light sensitive element 25 underneath. This will produce a negative electrical pulse from the light sensitive element. The duration of this pulse will be determined by the size of the written area or dot, and is about 25 nanoseconds per dot. When this light strikes an area in the "zero" state (high light conductivity state), it will be passed therethrough onto the light sensitive element and there will be a constant output from this element. The presence of written information will thus be indicated by the emittance of negative pulses from the light sensitive element. Various sensitive or photosensitive elements can be used for this purpose and in this particular example the S1 photomultiplier is employed. The focussing convex lens 24 positoned between disc 1 and photomultiplier 23 makes it possible to use photomultipliers of substantially smaller size than the width of the film 2 deposited on disc 1.

In order to change the information on a band of $VO_2$ film, it is necessary to clear the band completely back to state "zero" or point B on FIG. 4, and this is most conveniently done by cooling the selected band by energizing the appropriate thermoelectric element 57 and thereby bringing the temperature of the band below the temperature corresponding to point A in FIG. 4. Thus, inevitably, every area on the band will be in the "zero" state when the temperature is again allowed to rise to the general temperature of the chamber of 65° C. Then, writing can resume again on the band. The entire written matter on a disc can, of course, be easily erased by simply decreasing the temperature of chamber 11 to a level below point A on FIG. 4.

The operation of the apparatus illustrated in FIG. 2 will be very similar to that described above with reference to FIG. 1, however, the beams focussed on film 2 by compound lens 21, instead of passing through the film and the disc 1, will be reflected therefrom towards the photosensitive element 23. In this case, the writing, reading and erasing functions will follow the hysteresis curve shown in FIG. 5 and state "zero" would be at point F of the curve while state "one" would be at point H of the curve.

It should also be noted that the invention is in no way limited to the specific designs and examples mentioned above, but rather many variations and modifications thereof can be made by men familiar with the art without departing from the scope of the invention. Thus, the disc on which the memory film has been coated could be replaced by a drum with the photosensor positioned, for example, on the axis of the drum. Also, the film could be applied to a completely fixed plate which would be submitted to no rotation whatsoever and with all parts of the device being fixed. In such a case, one would use two acousto-optical or electro-optical reflectors or galvanometer mirrors that would operate at right angles to one another, one deflecting the beam in the X direction and the other in the Y direction and scanning the rectangular surface. Also, no attempt has been made to describe the electrical circuits used in conjunction with the output from the elements 23 and other circuits such as those used in the control system and the like. Such circuits to handle read out of disc memories as well as for controlling lasers and laser modulators and for temperature control systems, and the like, are well known in the relevant art.

We claim:

1. An optical memory device comprising: a substrate with a smooth surface; a film of a memory material coated on at least a portion of said smooth surface, said film of memory material exhibiting a wide hysteresis loop such that, at a same critical temperature, a high optical transmission or reflection value and a low optical transmission or reflection value, respectively, will be achieved depending on whether the film of said memory material is heated or cooled to reach said critical temperature; means for maintaining said substrate with the film of said memory material coated thereon at substantially said critical temperature; optical means and a source of irradiations interacting therewith for impinging upon said film irradiations of preselected wavelengths and power levels; and radiation sensitive means adapted to produce suitable output signals when said irradiations are directed thereonto from said film.

2. An optical memory device according to claim 1, wherein the source of irradiations is adapted to produce irradiations that will heat said film coated on said substrate at predetermined discrete areas upon which said irradiations impinge, thereby writing dots on said film which become stored at the critical temperature; said source of irradiations also being adapted to produce irradiations that will be blocked by the film when the critical temperature has been reached by cooling, but will pass therethrough when said critical temperature has been reached by heating; said irradiations passing through said film will be transmitted onto said radiation sensitive means and thereby produce suitable output signals resulting in reading of data written on said film.

3. An optical memory device according to claim 1, wherein the source of irradiations is adapted to produce irradiations that will heat said film coated on said substrate at predetermined discrete areas upon which said irradiations impinge, thereby writing dots on said film which will become stored at the critical temperature; said source of irradiations also being adapted to produce irradiations that will be blocked by the film when the critical temperature has been reached by heating, but will be reflected therefrom when said critical temperature has been reached by cooling; said irradiations reflected from said film will be directed to the radiation sensitive means and thereby produce suitable output signals resulting in reading of data written on said film.

4. An optical memory device according to claim 2, wherein said source of irradiations is adapted to produce, at a predetermined sequence, irradiations of preselected wavelength and power for writing and irradiations of another wavelength and power for reading.

5. An optical memory device according to claim 3, wherein said source of irradiations is adapted to produce, at a predetermined sequence, irradiations of preselected wavelength and power for writing and irradiations of another wavelength and power for reading.

6. An optical memory device according to claim 2, wherein said source of irradiations is adapted to produce, at a predetermined sequence, irradiations of preselected wavelength and high power for writing and continuous irradiations of the same wavelength and low power for reading.

7. An optical memory device according to claim 3, wherein aid source of irradiations is adapted to produce, at a predetermined sequence, irradaitions of preselected wavelength and high power for writing and continuous irradiations of the same wavelength and low power for reading.

8. An optical memory device according to claim 2, wherein said substrate is made of a transparent material capable of withstanding a temperature of about 400° C and capable of providing the film coated thereon with a wide hysteresis loop such that at a predetermined critical temperature, a high optical transmission value and a low optical transmission value, respectively, will be achieved depending on whether the film of said memory material is heated or cooled to reach said critical temperature.

9. An optical memory device according to claim 8, wherein said transparent material is fused silica or soda glass.

10. An optical memory device according to claim 3, wherein said substrate is made of a material capable of withstanding a temperature of about 400° C and capable of providing the film coated thereon with a wide hysteresis loop such that at a same critical temperature a high optical reflection value and a low optical reflection value, respectively, will be achieved depending on whether the said film is heated or cooled to reach said critical temperature.

11. An optical memory device according to claim 1, wherein said film is a film of $VO_2$.

12. An optical memory device according to claim 11, wherein said film has a thickness of between 1,000 and 4,000 Angstrom units.

13. An optical memory device according to claim 1, wherein said means for maintaining said substrate with the film of said memory material coated thereon at the critical temperature comprise an enclosure in which said substrate with said film coated thereon is mounted, means for bringing the temperature within said enclosure to the critical temperature value, and temperature control means for maintaining said temperature within the enclosure at said critical value.

14. An optical memory device according to claim 11, wherein said means for maintaining said substrate with the film of said memory material coated thereon at the critical temperature comprise an enclosure in which said substrate with said film coated thereon is mounted, a heater for bringing the temperature within said enclosure to said critical value, and temperature control means for maintaining said temperature within the enclosure at said critical value.

15. An optical memory device according to claim 1, wherein said optical means comprise a combination of mirrors and lenses for transmitting irradiations from the source thereof and focussing them onto the film of said memory material coated on the substrate.

16. An optical memory device according to claim 15, wherein between said source of irradiations and said optical means there are interposed means for interrupting the intensity of said irradiations at predetermined intervals.

17. An optical memory device according to claim 16, wherein said means for interrupting the intensity of irradiations consist of a modulator.

18. An optical memory device according to claim 1, wherein said optical means are also combined with means for effecting random scanning of said film by the irradiations impinging thereupon.

19. An optical memory device according to claim 1, further comprising means for producing synchronized and controlled relative movement between said substrate with the film of said memory material coated thereon and said source of irradiations.

20. An optical memory device according to claim 19, wherein said substrate with the film coated thereon is in the form of a disc and means are provided for rotating said disc at controlled speed and in a synchronized manner.

21. An optical memory device according to claim 1, wherein said source of irradiations is a laser and said radiation sensitive means comprise a photosensor for light beams produced by said laser.

22. An optical memory device according to claim 1, further comprising cooling means for cooling the film in predetermined areas.

* * * * *